No. 867,381. PATENTED OCT. 1, 1907.
R. KOELLE.
COMBINATION SEAT AND TOOL BOX FOR LOCOMOTIVE CABS.
APPLICATION FILED JULY 6, 1906.
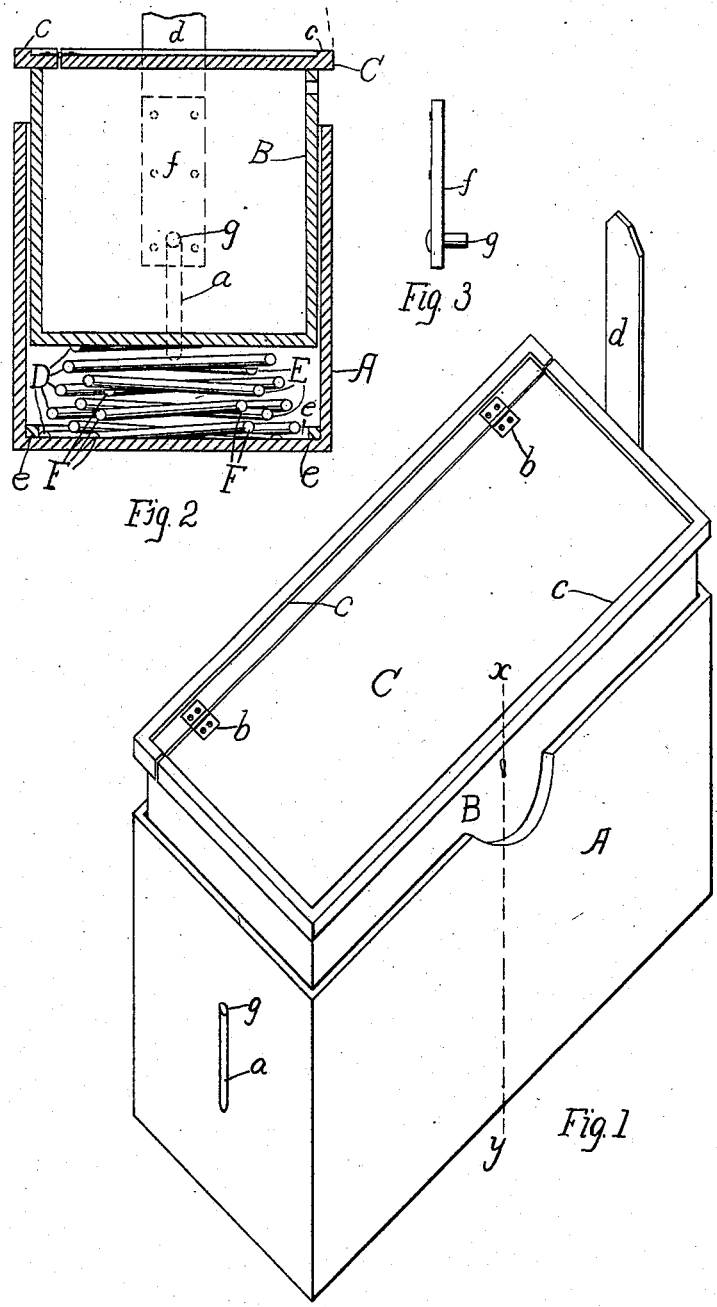
WITNESSES:
Thos. B. Chubb
Fred C. Smith
INVENTOR
R. Koelle
BY H. C. Gardiner
ATTORNEY

UNITED STATES PATENT OFFICE.

RUDOLPH KOELLE, OF SIOUX CITY, IOWA.

COMBINATION SEAT AND TOOL-BOX FOR LOCOMOTIVE-CABS.

No. 867,381.   Specification of Letters Patent.   Patented Oct. 1, 1907.

Application filed July 6, 1906. Serial No. 324,945.

*To all whom it may concern:*

Be it known that I, RUDOLPH KOELLE, a citizen of the United States, residing at Sioux City, in the county of Woodbury and State of Iowa, have invented new and useful Improvements in a Combination Seat and Tool-Box for Locomotive-Cabs, of which the following is a specification.

My invention relates to locomotive engines and the object of the invention is the provision of a spring seat and tool box for the engineer or fireman.

The invention consists in the novelty of arrangement and combination of parts as will be distinctly pointed out in the claims.

I have illustrated the invention in the accompanying drawing in which

Figure 1 is a perspective view of my invention. Fig. 2 is a cross-sectional view on line $x-y$, Fig. 1. Fig. 3 is a detail view of plate and bolt for connecting the two boxes.

Referring to the illustration, A is an ordinary box of oblong shape having a narrow slot $a$ in each end. Telescoped within said box is another box or seat B, having a cover C secured by hinges $b$, $b$, to the top of the box. The edge of the cover and top is formed into an elevated rim $c$ in order to more conveniently support a cushion which usually occupies the seat. Secured to one end of the box A and projecting upward above the seat is a brace or standard $d$ to which may be secured a back-rest if desired. Coil springs D, E, and F resting upon the bottom of the box A support the box B and furnish the desired springiness for the seat. These springs are graduated in size from D, the longest and highest to F, the smallest and shortest, and are "nested" or placed one within the other to act together, when the weight is sufficient to press the larger springs down to the level of the smaller. A strip $e$ is secured to the bottom of the box A, to hold the springs in place in the center. To each end of the seat or box B is secured a plate $f$ in the lower end of which is inserted a bolt $g$ which projects into the slot $a$ and prevents the seat from rising too high or being thrown out of the box A by a sudden jar.

My invention thus provides a substantial spring seat for the use of the engineer or fireman and the interior of the seat may still be utilized as a tool box as in the case of the ordinary seats.

Having described my invention, what I claim as new and desire to secure by Letters Patent, is—

In a locomotive seat and tool box, the combination with an outer box having slots in the ends thereof, of an inner box adjusted therein, bolts projecting from the ends of the inner box for guidance in said slots, coil springs resting on the bottom of said outer box and supporting said inner box, the springs being graduated in size and height and "nested" or placed one within the other and adapted to act together, a hinged cover for said inner box and means for holding the springs in place in the center of the outer box, substantially as described.

In testimony whereof I have signed my name to this specification in the presence of two subscribing witnesses.

RUDOLPH KOELLE.

Witnesses:
 H. C. GARDINER,
 A. M. STEVENS.